2,481,039

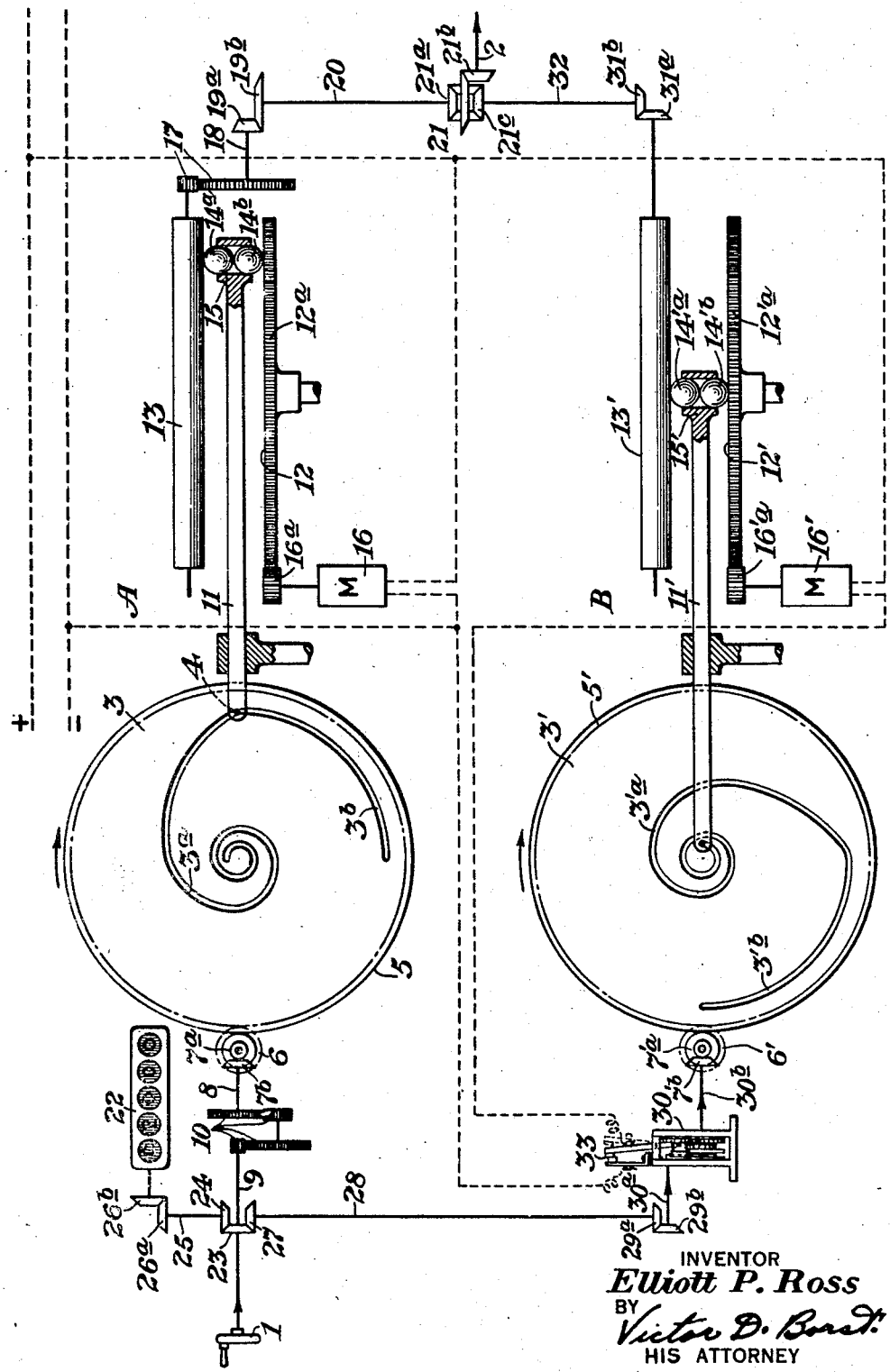
Sept. 6, 1949.  E. P. ROSS  2,481,039
RATE GENERATING MECHANISM
Filed Aug. 18, 1938
INVENTOR
*Elliott P. Ross*
BY
*Victor D. Borst*
HIS ATTORNEY Patented Sept. 6, 1949

UNITED STATES PATENT OFFICE 2,481,039

RATE GENERATING MECHANISM

Elliott P. Ross, Forest Hills, N. Y., assignor to The Sperry Corporation, a corporation of Delaware Application August 18, 1938, Serial No. 225,581

8 Claims. (Cl. 74—1)

The invention herein disclosed relates to a mechanism for generating motion at a rate proportional to a function of a quantity, and more particularly to a mechanism of this type that is effective over a wide range of input values.

Mechanisms of the type to which this invention relates have been long known and used in certain types of computing instruments. But such mechanisms, prior to this invention, have been limited in operation to a range of input values for which the function varies within the limits of a ratio of approximately fifteen to one. Design and manufacturing experience teaches that this limitation is inherent in these mechanisms as heretofore constructed in the sense that while theoretically such mechanisms are capable of operation over a wider range of input values, they are generally impractical for a range of input values having a rate of change of function greater than fifteen to one. This limitation in such mechanisms constitutes a serious handicap in certain instruments of which they form a part.

The invention herein disclosed has for an object to provide a mechanism of the type referred to that is operative over a much wider range of input values than the mechanisms which heretofore existed and that, for all practical purposes, is operative over an unlimited range of input values. The object of the invention is accomplished by combining two or more units in such a way that each is operative, within its limits of operability, to generate a rate of motion proportional to a function of a portion of the desired range of input values. This interrelation or combination of units is so effected that each unit comes into play only when the input value exceeds the operable range of the preceding unit or units. The motions generated by the several units are preferably added together and the output represents the total of the several units. In this way, a multiplicity of units may be interconnected and combined to generate rates of motion as a function of quantities varying over a practically unlimited range of input values.

A mechanism embodying the invention is illustrated diagrammatically in the accompanying drawing. The particular mechanism selected for illustration is one that operates to produce a rate of motion proportional to the reciprocal of an input quantity. It is capable of operation over a range of input values varying between the limits of values in a ratio of two hundred and twenty-five to one. However, for convenience, it is designed and laid out, and shall hereinafter be described as having an operable range of generating rates proportional to the reciprocal of input quantities varying within the limits of values in a ratio of one hundred to one.

In general, the mechanism illustrated in the drawings includes two units A and B, both identical, with one exception that will hereinafter appear. Each of these units is connected, in a manner to be specifically described, to a rotatable input element 1, illustrated as a hand-wheel. The units are also connected to a rotatably mounted output element 2, illustrated diagrammatically as a rotatable shaft. The unit A in the mechanism illustrated functions to produce a rate proportional to a function, the reciprocal, of an input quantity over a portion of the range of input values. The value of the input quantity is determined by the angular movement of the hand-wheel 1. This unit has an operable limit over a range of input values within the limits of a ratio of ten to one. When the input element or handle 1 has been rotated an amount representing a value beyond the portion of the range of input values for which unit A is effective, unit B comes into action.

Thus, assuming that the range of input values for which it be desired that the mechanism function is between twenty thousand and two hundred, the operation of the units will be as follows: Since the output is a rate proportional to the reciprocal of the input, the greater the input, the smaller the output rate. Thus, the unit A is arranged to take care of values from twenty thousand to two thousand. Utilizing the higher limit of twenty thousand as the starting point, the unit A will operate while the value of the input changes from twenty thousand to two thousand. At this value of input the unit A is generating the maximum rate of which it is capable. As the value decreases below two thousand unit B comes into action, unit A having been operating alone until the value of the input decreases below two thousand. The unit B thus produces a rate proportional to another portion of the range of input values, namely the portion between two thousand and two hundred. It will be appreciated that were the units designed to produce a rate directly proportional to a quantity rather than proportional to the inverse of the quantity, the units A and B would successively come into action in accordance with ascending values rather than descending values.

The unit A includes a circular, face cam 3 having a spiral cam groove 3a designed such that the distance of a cam follower 4 from the center of the cam is inversely proportional to the angular movement of the cam. At the end of the spiral cam groove, there is a circular, concentric groove 3b to permit additional rotation of the cam without change in the value represented by the distance of the cam follower from the center of the cam. This cam is rotatably mounted for rotation about its center.

The cam is rotated upon rotation of the handle 1 through gear teeth 5 formed on the periphery of the cam. These gear teeth mesh with a pinion 6 mounted on a shaft parallel to the axis of the cam. On the same shaft with the pinion there is a bevel gear 7a that meshes with a bevel gear 7b mounted on the end of a shaft 8. The shaft 8 is connected to the shaft 9 upon which the hand-wheel 1 is mounted through reduction gears 10. The reduction gears are such that the shaft 8 turns but one revolution for each ten revolutions of the shaft 9.

The cam follower 4 is secured to the movable element or arm 11 of a variable speed device. The variable speed device illustrated consists of a rotatably mounted driving element or disk 12, a rotatably mounted driven element or roller 13 and a pair of balls 14a and 14b constituting a driving connection between the driving and driven elements. The balls are constrained in a ball carriage 15 attached to the arm 11 and are movable from the center of the disk to a point adjacent the periphery of the disk. The disk 12 is driven at a constant speed by a constant speed motor 16. The driving connection between the motor and the disk is illustrated as consisting of a pinion 16a mounted on the shaft of the motor and meshing with gear teeth 12a formed on the periphery of the disk. Such variable speed devices are well known, a suitable one being illustrated and described in Patent No. 1,317,915, issued October 7, 1919.

From the foregoing it will be seen that the cam 3 is rotated proportionally to the rotation of the input element. In consequence, the cam follower 4, and through the arm 11, the ball carriage 15 of the variable speed device, is moved proportionally to the inverse or reciprocal of the quantity introduced, represented by the angular movement of the handle 1. Thus, the driven element 13 of the variable speed device is rotated at a rate proportional to the reciprocal of the input quantity.

The driven element 2 is rotated in accordance with the rotation of the driven element 13 through a train of gears and shafts including reduction gears 17 connecting the driven element 13 with a shaft 18, reduction, bevel gears 19a and 19b connecting shaft 18 with a shaft 20 and a differential 21 to one side 21a of which shaft 20 is connected and to the center 21b of which shaft 2, the output element, is connected.

A counter 22 is utilized to indicate the quantity of the input. This is a common counter mechanism that is connected to the shaft 9. This connection is through a bevel gear 23 mounted on the shaft 9. Another bevel gear 24 is mounted on one end of a shaft 25 and on the other end of this shaft there is a bevel gear 26a that meshes with a bevel gear 26b mounted on the shaft of the counter mechanism.

The connection from the input element to the unit B is also effected through the bevel gear 23 mounted on the shaft 9. A gear 27 mounted upon one end of a shaft 28 meshes with the gear 23 and is driven thereby. On the other end of the shaft 28 there is a bevel gear 29a meshing with a bevel gear 29b mounted on the shaft 30a of an intermittent drive mechanism 30. This intermittent drive mechanism interconnects the shaft 30a and a shaft 30b through which rotation of the cam 3' of the unit B is effected. The intermittent drive is such that it interconnects shafts 30a and 30b only after shaft 30a has been rotated a certain predetermined amount. In this instance the intermittent drive connects shafts 30a and 30b for operation in a one to one ratio only after the hand-wheel 1 has been turned to indicate a value on the counter 22 of two thousand and the driving connection between shafts 30a and 30b continues only as long as the value on the counter is two thousand or less. In the case of an output as a direct function of the input, rather than an inverse function, the operation would be reverse, that is, for example, the shafts 30a and 30b would be connected for values above two thousand and disconnected below two thousand. This intermittent drive has not been shown in detail as a suitable mechanism of this type is illustrated and described in Patent No. 1,811,624, issued June 23, 1931.

As previously stated, the unit B is, in all respects, except one, similar to the unit A. In consequence, the unit B will not be described in detail but the parts thereof are given numbers corresponding to the numbers applied to similar parts in the unit A. The numbers applied to the parts of unit B are however primed. The exception referred to is that the arm or link 11' of the unit B connecting the cam follower 4' and the ball carriage 15' is shorter, by one tenth, than the arm 11 of the unit A. The reason for this is as follows: Since the unit A is operating at its maximum speed when the unit B comes into action and since the rotation of the output 2 is the sum of the rotation of the variable speed devices of units A and B, it is only necessary for unit B to supply a range of rates for values between the limits of the ratio of zero and nine in order for the complete mechanism to operate the output over a range of rates in the ratio of one to one hundred.

The driven roller 13' of the unit B is connected by bevel gears 31a and 31b and a shaft 32 to the side 21c of the differential 21. In this way the center of the differential and consequently the output 2 is driven in accordance with the sum of the rotations of the driven elements 13 and 13' of the variable speed devices of units A and B.

The wiring arrangement for the motors 16 and 16' is indicated in dotted lines. The motor 16 is permanently connected across the line so that it is always operating when the instrument is in use. The motor 16' is connected across the line through a switch 33 that closes when the intermittent drive 30 operates to connect shafts 30a and 30b and that opens when these shafts are disconnected.

In the mechanism disclosed in the drawings and described above, the cam of unit A is laid out on the basis of one revolution being equal to a value of eight thousand, the total limit of the cam, therefore, being between twenty thousand and two thousand. The cam of unit B is laid out on the basis of one revolution being equal to a value of eight hundred, the total limit of the cam being between two thousand and two hundred. To accommodate this variation, the ten to one reduction gears 10 are utilized in the drive between the input and the cam 3. Also the disks 12 and 12' are driven at the same constant speed and at such a speed that the driven roller of the variable speed device of unit A may be driven, depending upon the position of the ball carriages, at speeds from ten to one hundred revolutions per minute and the driven roller of the variable speed device of unit B may be driven at speeds from zero to ninety revolutions per minute. Since it is desired to have an output rate of from one revolution per minute to one hundred revolutions per minute, the reduction gearing 17 and 19a, 19b are utilized to reduce the speed of the shaft 20 in a ratio of ten to one with respect to the roller 13.

For the purpose of explaining the operation of the mechanism, we may assume that the counter 22 reads twenty thousand. Under these conditions, unit B is as shown, the switch 33 being open and the ball carriage 15' being at the center of the disk 12'. In unit A, the cam follower 4 will be at the innermost end of the cam groove 3a. The ball carriage 15 will be near, but not at, the center of the disk 12, the relation being such that shaft 20 turns one revolution for each revolution of the disk 12. Thus, the output shaft 2 rotates one revolution for each revolution of the disk 12, the connection between the shaft 2 and the center of the differential 21 being in a one to two ratio since the center turns half as fast as a side. This rotation of the output represents a rate proportional to the reciprocal of twenty thousand.

Now assume that the hand-wheel 1 is turned to reduce the value on the counter 22. The ball carriage 15 is moved outwardly or radially of the disk 12 proportionally, by virtue of cam 3, to the inverse of the value on the counter. At a value on the counter of two thousand the parts are as shown in the drawings. The ball carriage 15 is in its outermost position, the shaft 20 and the output 2 are rotating at ten revolutions per minute. The switch 33 has closed and the shafts 30a and 30b are connected but shaft 30b has not yet rotated. Therefore, there is as yet no output from unit B.

If hand-wheel 1 is now rotated to further decrease the value on the counter 22, the cam follower 4 rides in the groove 3b maintaining the unit A at its maximum rate of ten revolutions per minute. Cam follower 4' is, however, now moving in groove 3'a and causing ball carriage 15' to move outwardly on disk 12'. The output of unit B is added to that of unit A and as stated ranges from zero to ninety revolutions per minute. When the value on the counter is two hundred, ball carriage 15' is at its outermost position and supplying ninety revolutions per minute to the side 21c of the differential. This is added to the ten revolutions per minute generated by unit A and the output 2 is rotating at one hundred revolutions per minute. On the reverse of the operation of the hand-wheel 1 the parts operate in the reverse order.

Several more units might be added and interconnected in the same manner to obtain an output rate proportional to a function of a quantity over a wider range of values. For example, if three units be so combined each designed for an output in a ratio of fifteen to one, the mechanism will operate over a range of values within the limits of the ratio of three thousand three hundred and seventy-five to one. Similarly three units each having a range of values within the limits of ten to one so combined and interconnected will operate over a range of values within the limits of the ratio of one thousand to one.

It will be understood that the numerical values given are for illustrative purposes and that those skilled in the art may vary them as conditions of use demand. Also, the function of the input may be such that the cams of the various units are different. The functions may be reversible, in that case, the transfer from unit to unit may conveniently be made at the point of reversal or conditions may be such that an intermittent drive is in the connection to each of the generating unit instead of the section 3b for example of unit A. Uses for which the invention is particularly suited are the generation of rates of motion corresponding to the trigonometric functions of angles or logarithmic values of the input or powers or roots of input values.

It will be obvious that various changes may be made by those skilled in the art in the embodiment of the invention illustrated in the drawings and described above within the principle and scope of the invention as expressed in the appended claims.

I claim:

1. Means for obtaining an output rate proportional to a function of an input over a wide range of input values, comprising input means including rotatably mounted cam mechanism, output means including a variable speed device settable by the cam mechanism, and means to introduce input values into the input means including a transmission operable at one ratio during predetermined values of input and at another ratio at other values of input.

2. Means for obtaining an output rate proportional to a function of an input over a wide range of input values, comprising input means including rotatably mounted cam mechanism, output means including a variable speed device settable by the cam mechanism, and means to introduce input values into the input means including a transmission having two branches one branch of which is operable throughout the entire range of input values and the other branch of which is operable through a part only of said range.

3. Means for obtaining an output rate proportional to a function of an input over a wide range of input values, comprising input means including rotatably mounted cam mechanism, output means including a variabe speed device settable by the cam mechanism, and means to introduce input values into the input means including a transmission having two branches one branch of which includes interrupting means automatically operable at a predetermined value of input.

4. Means for obtaining an output rate proportional to a function of an input over a wide range of input values, comprising two rotatably mounted cams, two variable speed devices each including a rate control member settable by one of the cams, output means including a differential connected to the two variable speed devices, and input means for operating the cams including a transmission having a branch leading to each cam at a different ratio.

5. Means for obtaining an output rate proportional to a function of an input over a wide range of input values, comprising two rotatably mounted cams, two variable speed devices each including a rate control member settable by one of the cams, output means including a differential connected to the two variable speed devices, and input means for operating the cams including a transmission having a branch leading to each cam at a different ratio and an automatic interrupter in one branch operative at a predetermined value of input.

6. Means for obtaining an output rate proportional to a function of an input over a wide range of input values, comprising input means including rotatably mounted cam mechanism, output means including a variable speed device settable by the cam mechanism, and means to introduce input values into the input means including a transmission having two branches, means to disconnect one of said branches, and means automatically acting at a predetermined value of input to connect said one branch and maintain it connected for operation over a predetermined range of input values.

7. Means for obtaining an output rate proportional to a function of an input over a wide range of input values, comprising two rotatably mounted cams, two variable speed devices each including a rate control member settable by one of the cams, output means including a differential connected to the two variable speed devices, and input means for operating the cams including a transmission having a branch leading to each cam at a different ratio and an automatic means to maintain one of said branches inoperative over a predetermined range of input values and operative over another range of input values.

8. Means for obtaining an output rate proportional to a function of an input over a wide range of input values, comprising input transmission means, two variable speed devices, each variable speed device including a rate control member, means connecting the rate control member of one of said devices to said input transmission means, said connecting means being effective to control the operation of one of said devices between predetermined limiting input values and in accordance with a function of the input value, means automatically operable to connect the rate control member of the second of said devices to said input transmission means when one of said limiting input values is reached and to maintain it connected over a predetermined range of input values, said automatically operable means being effective to control the operation of the second device over the predetermined range of input values and in accordance with a function of said values, and output means connected to combine the outputs of both variable speed devices.

ELLIOTT P. ROSS.

REFERENCES CITED

The following references are of record in the file of this patent:

UNITED STATES PATENTS

| Number | Name | Date |
|---|---|---|
| 1,229,879 | Buffat | June 12, 1917 |
| 1,317,915 | Ford | Oct. 7, 1919 |
| 1,398,417 | Chicken et al. | Nov. 29, 1921 |
| 1,448,490 | Moakley | Mar. 13, 1923 |
| 1,540,610 | Desmoulins | June 2, 1925 |
| 1,606,869 | Christophel | Nov. 16, 1926 |
| 1,701,582 | Mengden | Feb. 12, 1929 |
| 1,894,308 | Fleischmann et al. | Jan. 17, 1933 |
| 1,964,188 | Von Karabetz | June 26, 1934 |
| 2,002,585 | Rothwell, Jr., et al. | May 28, 1935 |
| 2,059,423 | Weiss | Nov. 3, 1936 |
| 2,089,878 | Corbin | Aug. 10, 1937 |
| 2,134,298 | Brown | Oct. 25, 1938 |